United States Patent
Wang et al.

(10) Patent No.: US 8,823,655 B2
(45) Date of Patent: Sep. 2, 2014

(54) TOUCH-POINT COORDINATE DETECTING METHOD

(75) Inventors: Chao-Chen Wang, Hsin-Chu (TW); Heng-Sheng Chou, Hsin-Chu (TW); Pang-Chiang Chia, Hsin-Chu (TW); Yuet-Ping Lee, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 861 days.

(21) Appl. No.: 12/786,542

(22) Filed: May 25, 2010

(65) Prior Publication Data

US 2010/0315361 A1    Dec. 16, 2010

(30) Foreign Application Priority Data

Jun. 11, 2009    (TW) .............................. 98119608 A

(51) Int. Cl.
  *G06F 3/041*    (2006.01)
  *G06F 3/045*    (2006.01)
  *H04N 5/225*    (2006.01)
  *G06K 9/34*     (2006.01)

(52) U.S. Cl.
  CPC .................................... *G06F 3/0416* (2013.01)
  USPC ............ 345/173; 345/174; 345/178; 348/169; 348/172; 382/180

(58) Field of Classification Search
  CPC .......... G06F 3/041; G06F 3/048; G06F 3/044
  USPC .......... 345/173–174, 178; 382/103, 257, 180; 348/169–172
  See application file for complete search history.

(56) References Cited

U.S. PATENT DOCUMENTS

| | | | |
|---|---|---|---|
| 7,801,330 B2 | 9/2010 | Zhang et al. | |
| 2007/0070047 A1* | 3/2007 | Jeon et al. | 345/173 |
| 2007/0075983 A1 | 4/2007 | Chiu et al. | |
| 2007/0127774 A1 | 6/2007 | Zhang et al. | |
| 2009/0096758 A1* | 4/2009 | Hotelling et al. | 345/173 |
| 2010/0046850 A1* | 2/2010 | Ho et al. | 382/257 |

FOREIGN PATENT DOCUMENTS

| | | |
|---|---|---|
| CN | 101387927 A | 3/2009 |
| CN | 101408821 A | 4/2009 |
| JP | 2007102749 A | 4/2007 |
| TW | I284827 | 8/2007 |
| TW | M341894 | 10/2008 |
| TW | 200903386 A | 1/2009 |
| WO | 2008094553 A2 | 8/2008 |
| WO | 2008094553 A3 | 8/2008 |

* cited by examiner

*Primary Examiner* — Kenneth Bukowski
(74) *Attorney, Agent, or Firm* — WPAT, PC; Justin King

(57) ABSTRACT

A method for detecting touch-point coordinates includes: scanning a plurality of signal points in sequence to generate a plurality of original data including a plurality of original touch point data; performing a grouping algorithm for the original touch point data to group the original touch point data into a plurality of group sets; and calculating a barycentric coordinate of each of the group sets and outputting the barycentric coordinate as a touch-point coordinate of each of the group sets.

17 Claims, 6 Drawing Sheets

| Identification code | Amount of the original touch point data | X-coordinate weighted value | Y-coordinate weighted value | X-coordinate weighted average value | Y-coordinate weighted average value |
|---|---|---|---|---|---|
| 1 | 1 | 1 | 1 | 1 | 1 |
| 2 | 1 | 3 | 1 | 3 | 1 |
| 3 | 4 | 26 | 4 | 6.5 | 1 |
| 4 | 1 | 1 | 3 | 1 | 3 |
| 5 | 1 | 3 | 3 | 3 | 3 |
| 6 | 3 | 18 | 9 | 6 | 3 |
| 7 | 4 | 4 | 26 | 1 | 6.5 |
| 8 | 3 | 9 | 18 | 3 | 6 |
| 9 | 10 | 68 | 68 | 6.8 | 6.8 |

FIG. 7

TOUCH-POINT COORDINATE DETECTING METHOD

CROSS-REFERENCE TO RELATED APPLICATIONS

This application is based upon and claims the benefit of priority from the prior Taiwan Patent Application No. 098119608, filed Jun. 11, 2009, the entire contents of which are incorporated herein by reference.

BACKGROUND

1. Field of the Invention

The present invention relates to the field of the touch detecting technology, and more particularly to a touch-point coordinate detecting method which can detecting many touch points.

2. Description of the Related Art

Touch panels are widely integrated in various electronic products to be served as input devices. Users can only employ an touch object (such as a figure or a touch pen) to glide on or contact with the touch panels, such that cursors thereof relatively move or absolute coordinates thereof move to finish various input operations, such as writing words, scrolling viewpoints and generating virtual keys, etc.

Currently, the touch panels integrated into the electronic products includes surface mount touch panels and in-cell touch panels. The in-cell touch panels may be achieved in manufacturing thin-film transistor liquid crystal displays (TFT-LCD) to remain the excellent electro-optical property of the original displays and have the high-integrated touch function. Compared with the conventional surface mount touch panels, the in-cell touch panels can greatly decrease the cost thereof, thus they are paid more attention. Various touch-point coordinate detecting methods adapted into the in-cell touch panels and configured for detecting a plurality of touch points are provided. However, the touch properties achieved by the touch-point coordinate detecting methods are different with each other, therefore it is needed to persistently improve the touch-point coordinate detecting methods.

BRIEF SUMMARY

The present invention relates to a method for detecting touch-point coordinates, which can detect coordinates of many touch points.

A method for detecting touch-point coordinates in accordance with an exemplary embodiment of the present invention, comprises: scanning a plurality of signal points in sequence to generate a plurality of original data including a plurality of original touch point data; performing a grouping algorithm for the original touch point data to group the original touch point data into a plurality of group sets; and calculating a barycentric coordinate of each of the group sets and outputting the barycentric coordinate as a touch-point coordinate of each of the group sets.

In an exemplary embodiment of the present invention, the step of performing the grouping algorithm for the original touch point data to group the original touch point data into a plurality of group sets comprises: enduing each of the original touch point data with an identification code; grouping the original touch point data with the same identification code into the same group set; and grouping the original touch point data with different identification codes into different group sets.

In an exemplary embodiment of the present invention, the step of enduing each of the original touch point data with the identification code comprises: judging whether adjacent original touch point data exists in adjacent signal point, which are adjacent to a current original touch point data of a current signal point and the adjacent signal points are scanned before scanning signal point; and enduing the current original touch point data of the current signal point with an identification code the same as those of the adjacent signal points when the adjacent original touch point data exists in the adjacent signal points, or enduing the current original touch point data of the current signal point with a new identification code when the adjacent original touch point data of the adjacent signal point is absent.

In an exemplary embodiment of the present invention, the step of enduing each of the original touch point data with the identification code further comprises: detecting an amount of the adjacent original touch point data of the current original touch point data; and performing an identification-code combining operation for the adjacent original touch point data for changing at least one of the identification codes of the adjacent original touch point data to make the identification codes of the adjacent original touch point data be identical when the amount of the adjacent original touch point data is more than one and the identification codes of the adjacent original touch point data are different.

In an exemplary embodiment of the present invention, the touch-point coordinate detecting method is adapted for a liquid crystal display with an in-cell touch panel. Herein, a sequence of enduing each of the original touch point data with the identification code is related with a mode of the liquid crystal display scanning the signal points.

In an exemplary embodiment of the present invention, the step of calculating the barycentric coordinate of each of the group sets comprises: performing weighted average operations for first-dimensional coordinates and second-dimensional coordinates of the original touch point data in each of the group sets to achieve the barycentric coordinate of each of the group sets.

A method for detecting touch-point coordinates in accordance with another exemplary embodiment of the present invention comprises: generating a plurality of original data which comprises a plurality of original touch point data; enduing each of the original touch point data with an identification code to identify a plurality of contact areas where the original touch point data are located; calculating a barycentric coordinate of the original touch point data in each of the contact areas; and outputting the barycentric coordinates as coordinates of touch areas. The step of enduing each of the original touch point data with the identification code to identify the contact areas where the original touch point data are located, comprises: judging whether there exists adjacent original touch point data which are adjacent to a current original touch point data and are endued with the identification code before enduing the current original touch point data with the identification code; and when there exists the adjacent original touch point data, enduing the current original touch point data with an identification code the same as those of the adjacent original touch point data, otherwise enduing the current original touch point data with a new identification code. Furthermore, the step of enduing each of the original touch point data with the identification code to identify the contact areas where the original touch point data are located, further comprises: detecting an amount of the adjacent original touch point data of the current original touch point data; and performing a combining operation for the adjacent original touch point data for changing at least one of the identification codes of the adjacent original touch point data to make the identification codes of the adjacent original touch point data be identical when the amount of the adjacent original touch point data are more than one and the identification codes of the adjacent original touch point data are different.

A method for detecting touch-point coordinates in accordance with other exemplary embodiment of the present invention comprises: scanning a plurality of signal points generated in a single touch operation, in sequence to generate a plurality of original touch point data; enduing each of the original touch point data with an identification code according to a rule of enduing continuous points in a two-dimensional space with the same identification code and enduing discontinuous points therein with different identification codes; calculating a barycentric coordinate of the original touch point data with the same identification code to achieve at least one barycentric coordinate corresponding to the original touch point data; and outputting the at least one barycentric coordinate as a result of the single touch operation.

The exemplary embodiment of the present invention mainly employs the group sets to endue the received original touch point data with the identification codes for identifying the group sets and calculating the barycentric coordinates of the group sets to generate the corresponding coordinates of the many touch points. Thus the present invention can output the real coordinates of the many touch points and can be configured for detecting the many touch points.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 7 shows a calculating method for the barycentric coordinates of the group sets as shown in FIG. 6.

DETAILED DESCRIPTION

Reference will now be made to the drawings to describe exemplary embodiments of the present method for detecting touch-point coordinates in detail. The following description is given by way of example, and not limitation.

The following will be cooperated with FIGS. 1 to 7 to describe a method for detecting touch-point coordinates in detail in accordance with an exemplary embodiment of the present invention. The method for detecting the touch-point coordinates is adapted into a LCD (liquid crystal display) with an in-cell touch panel, but the present invention is not limited in this. The LCD includes a display region having a plurality of pixels arranged in matrix. In this exemplary embodiment, the LCD employs a scanning method for scanning the pixels from left to right and from up to down.

Figures 1, 2:
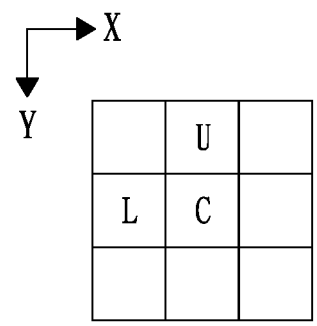
FIG. 1 is a method for judging adjacent points in accordance with an exemplary embodiment of the present invention.
FIG. 2 is a coding rule of identification codes in accordance with the exemplary embodiment of the present invention.

Firstly, the following will be cooperated with FIG. 1 to describe a method for judging adjacent signal points in this exemplary embodiment. Referring to FIG. 1, nine signal points A~I are shown therein. For a signal point E, four signal points B, D, F and H (panes filled with diagonals as shown in FIG. 1) are judged to be the adjacent points of the signal point E, and signal points A, C, G, H are judged to be the non adjacent points of the signal point E.

Then, the following will be cooperated with FIG. 2 to describe coding rules for enduing the signal points with identification codes in the exemplary embodiment. Referring to FIG. 2, three signal points U, L and C are shown therein, wherein the signal point U is an up adjacent point of the signal point C and the signal point L is a left adjacent point of the signal point C, wherein each of the signal points has an original data respectively. The identification codes of the signal points U, L and C are indicated by ID(U), ID(L) and ID(C) respectively. The original data of the signal points U, L and C are selected from the logic 0 or the logic 1. The logic 0 represents an original non touch point data and the logic 1 represents an original touch point data. When C=0, a coding rule r0 is performed not to endue ID(C) with any indication code. When C=1, five coding rules r1~r5 may be performed by judging the states of the up adjacent signal point U and the left adjacent signal point L of the signal point C. (r1) when U=0 and L=0, it will endue ID(C) with a new indication code. (r2) when U=1 and L=0, it will make ID(C)=ID(U). (r3) when U=0 and L=1, it will make ID(C)=IC(L). (r4) when U=1 and L=1, if ID(U)=ID(L), it will make ID(C)=ID(U) or ID(C)=ID(L). (r5) when U=1 and L=1, if ID(U)#ID(L), it will make ID(C)=ID(U), and group ID(U) and ID(L) as the same group set.

Figure 3:
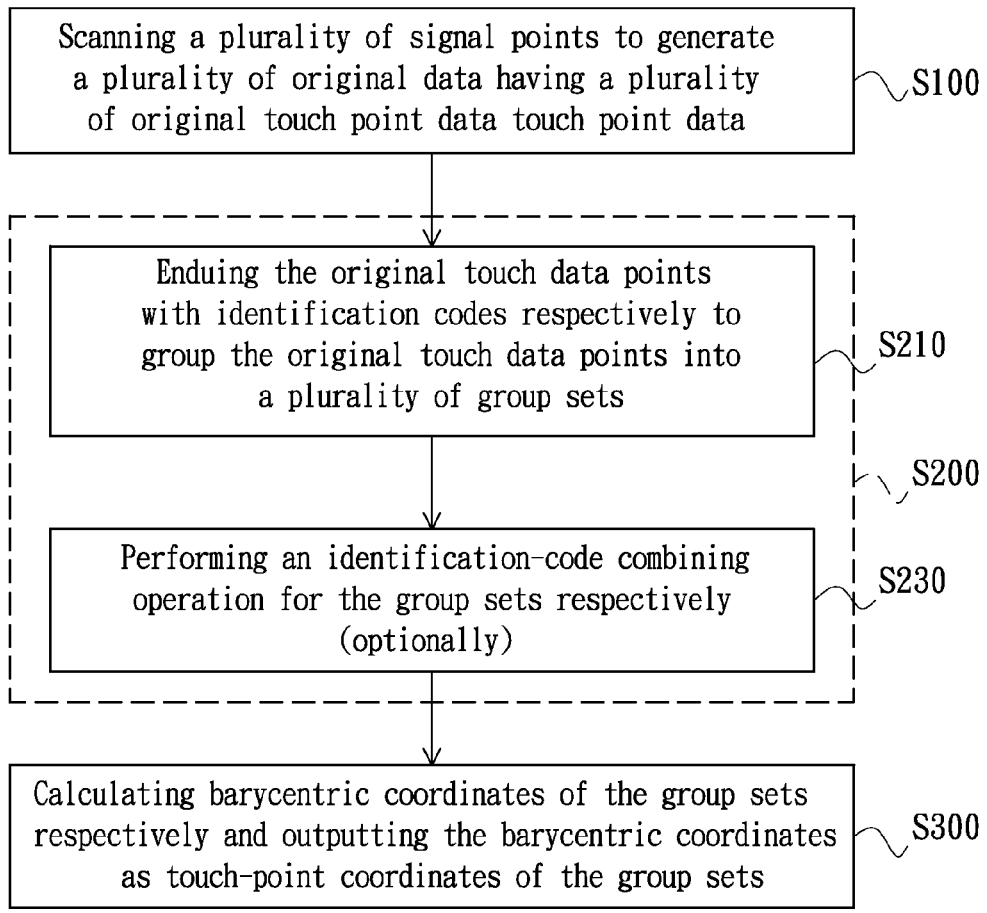
FIG. 3 is a flow chart of a touch-point coordinate detecting method in according to the exemplary embodiment of the present invention.

Refer to FIG. 3, which is a flow chart of the method for detecting the touch-point coordinates in accordance with the exemplary embodiment of the present invention. As shown in FIG. 3, the method for detecting the touch-point coordinates of the exemplary embodiment includes steps S100~S300, and the following will be cooperated with FIGS. 3 to 7 to describe the steps S100~S300 in detail.

Figure 4:
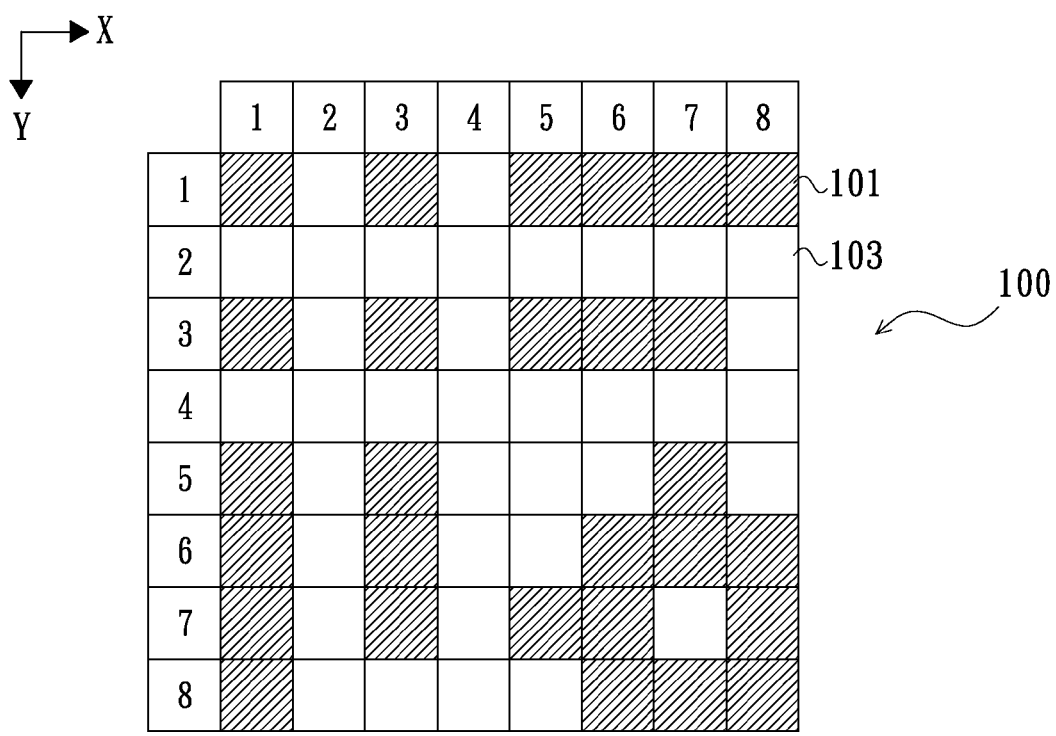
FIG. 4 shows an original data received by performing a single touch operation.

The step S100 is scanning the plurality of the signal points to generate a plurality of original data having a plurality of original touch point data. FIG. 4 shows a matrix of a plurality of signal points and a plurality of original data 100 of the signal points generated by performing a single touch operation. Referring to FIG. 4, numbers 1~8 in a direction X and a direction Y respectively indicate coordinate scales in the direction X and the direction Y. The original data 100 includes a plurality of original touch point data 101 (panes filled with diagonals as shown in FIG. 4) and a plurality of original non-touch point data 103 (panes not filled with the diagonals as shown in FIG. 4). Herein, the original touch point data 101 correspond to signals generated from areas touched by a touch object (such as, a finger) in this touch operation, and the original non-touch point data 103 correspond to signals generated from areas not touched by the touch object. Furthermore, in this exemplary embodiment, the values of the original touch point data 101 are defined as the logic 1, and the values of the original non-touch point data 103 are defined as the logic 0. The method for detecting the touch-point coordinates of this exemplary embodiment employs a scanning mode from left to right and from up to down as the LCD scanning mode, to read the original data 100 (including the original touch point data 101 and the original non-touch point data 103).

The step S200 is performing a grouping algorithm for the original touch point data to group the original touch point data into a plurality of group sets. The step S200 of the exemplary embodiment includes a step S210 and an optional step S230, which are described in following in detail.

Figure 5:
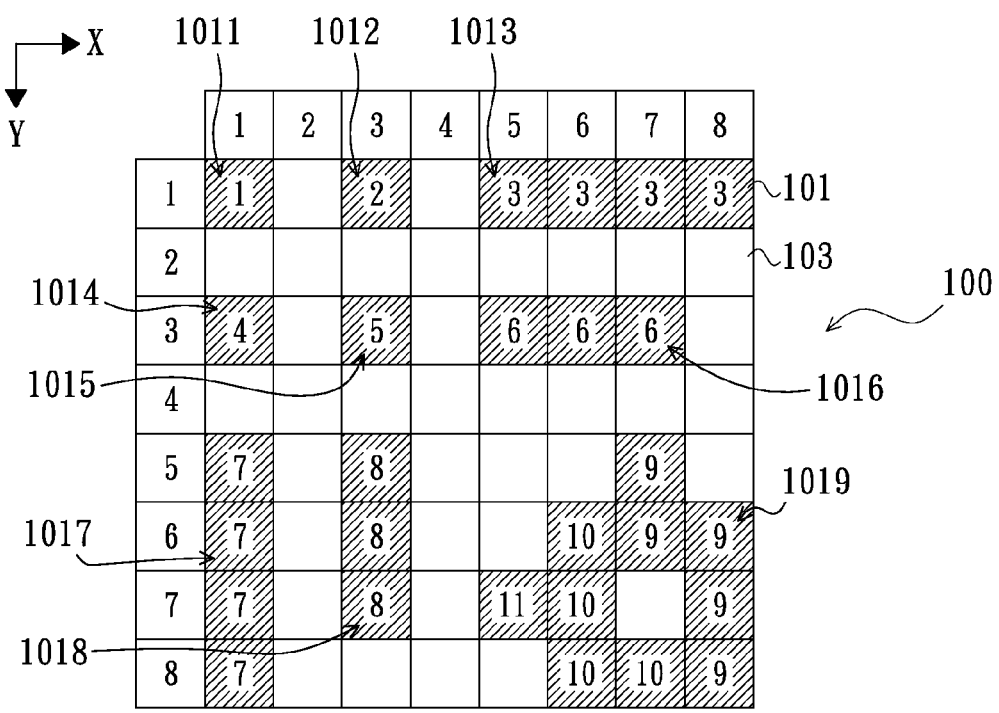
FIG. 5 shows a state of the original data as shown in FIG. 4 after enduing each of the original touch point data with the identification code.

The step S210 is enduing the original touch point data with the identification codes respectively to group the original touch point data into the plurality of group sets. FIG. 5 shows the state of the original data 100 as shown in FIG. 4 after enduing the original touch point data 101 with the identification codes. The sequence of enduing the original touch point data 101 with the identification codes is from left to right and from up to down. As shown in FIG. 5, the original non-touch point data 103 of the original data 100 are not endued with any identification code according to the coding rule r0. The original touch point data 101 are grouped into the plurality of group sets 1011~1019 by performing the grouping algorithm, and the group sets 1011~1019 correspond to different contact areas respectively. Herein, the grouping algorithm is enduing the original touch point data 101 with the identification codes 1~11 in sequence respectively according to the coding rules r1~r5, for grouping the original touch point data 101 with the identification codes 1~8 into eight group sets 1011~1018, and grouping the original touch point data 101 with the identification codes 9~11 into the same group set 1019. It can be easily understood by those skilled in the art that the original touch point data 101 in the group sets 1011, 1012, 1014 and 1015 are endued with the identification codes according to the coding rule r1, the original touch point data 101 in the group sets 1013 and 1016 are endued with the identification codes according to the coding rules r1 and r3, and the original touch point data 101 in the group sets 1017 and 1018 are endued with the identification codes according to the coding rules r1 and r2.

Furthermore, the original touch point data 101 is endued with a new identification code 9 for signal point (X7, Y5) according to the coding rule r1 (i.e., ID(X7, Y5) is set as 9). The original touch point data 101 is endued with a new identification code 10 for signal point (X6, Y6) according to the same coding rule r1 (i.e., ID(X6. Y6) is set as 10). The original touch point data 101 is endued with the identification code 9 for signal point (X7, Y6) according to the coding rule r5 (i.e., ID(X7, Y6) is set as 9) since the identification code of the left adjacent signal point (X6, Y6) is different from the identification code of the up adjacent signal point (X7, Y5) and the identification code of the up adjacent signal point (X7, Y5) is endued with 9. While ID(X7, Y6) is endued with 9, the left adjacent signal point (X6, Y6) and the up adjacent signal point (X7, Y5) are grouped in the same group 1019 according to coding rule r5. The same grouping operation is occurred during setting the identification code for signal point (X6, Y7) and signal point (X8, Y8), respectively. Accordingly, the signal points whose identification code is endued with 9, 10 or 11 are grouped together to form the group set 1019.

Figure 6:
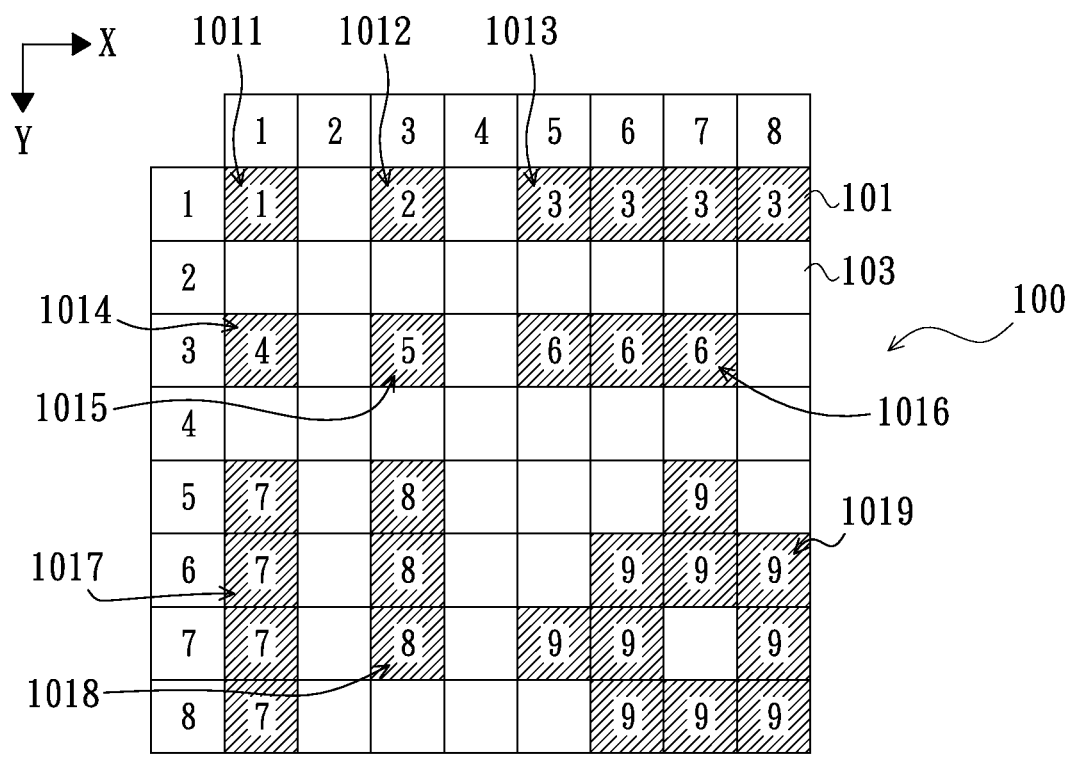
FIG. 6 shows a state of the original data as shown in FIG. 5 after performing an identification-code combining operation for the group sets.

The step S230 is performing an identification-code combining operation for the group sets. FIG. 6 shows a state of the original data 100 as shown in FIG. 5 after the group sets 1011~1019 performing the identification-code combining operation. As shown in FIG. 5, the group set 1019 has some adjacent original touch point data 101 with different identification codes. All of the group sets 1011~1018 have no adjacent original touch point data 101 with different identification codes. Therefore, this exemplary embodiment only needs to perform the identification-code combining operation for the group set 1019. As shown in FIG. 5, some of the original touch point data 101 of the group set 1019 are endued with the identification code 9, some thereof are endued with the identification code 10, and other thereof are endued with the identification code 11. The original touch point data 101 of signal point (X6, Y6) with the identification code 10 is adjacent to the original touch point data 101 of signal point (X7, Y6) with the identification code 9. For this situation, the identification code 10 of the original touch point data 101 of signal point (X6, Y6) is changed to be 9 since the original touch point data 101 of signal point (X6, Y6) is adjacent to the original touch point data 101 of signal point (X7, Y6) and they are both in the group set 1019. Similarly, the identification code 10 of other original touch point data 101 and the identification code 11 of the original touch point data 101 is changed to be the identification code 9 according to the same consideration (as shown in FIG. 6). In other words, the amount of the adjacent original touch point data of the current original touch point data is detected, and at least one of the identification codes of the adjacent original touch point data is changed to make the identification codes of the adjacent original touch point data be identical when the amount of the adjacent original touch point data is more than one, and the identification codes of the adjacent original touch point data are different.

As shown in FIG. 6, after performing the identification-code combining operation for the adjacent original touch point data with the different identification codes, the original touch point data 101 in the group set 1019 only have a single identification code 9. Furthermore, as shown in FIG. 6, the original touch point data 101 in each of the group sets 1011~1019 has a single identification code, and the original touch point data 101 in different group sets has different identification codes. In addition, the original touch point data 101 in the same group set are continuous in the XY two-dimensional space. For example, four original touch point data 101 in the group set 1013 form a continuous area and are continuous panes in the XY two-dimensional space. The original touch point data 101 in the different group sets are discontinuous in the XY two-dimensional space. For example, an original touch point data 101 in the group set 1012 and four original touch point data 101 in the group set 1013 form a discontinuous area and are discontinuous panes in the XY two-dimensional space.

The step S300 is calculating barycentric coordinates of the group sets and outputting the barycentric coordinates as the touch-point coordinates of the group sets 1011~1019. FIG. 7 shows a method for calculating the barycentric coordinates of the group sets 1011~1019 as shown in FIG. 6. In FIG. 7, the barycentric coordinate of each of the group sets 1011~1019 is achieved by calculating a X-coordinate weighted average value and a Y-coordinate weighted average value of each of the original touch point data therein. Employing the group set 1013 as an example, the identification code of the group set 1013 is 3, the amount of the original touch point data therein is 4, an X-coordinate weighted value is 26 and a Y-coordinate weighted value 4. Therefore, the X-coordinate weighted average value is 26/4=6.5 and the Y-coordinate weighted average value 4/4=1, and the barycentric coordinate of the group set 1013 is (6.5, 1). The barycentric coordinates of the other group sets 1011, 1012 and 1014~1019 are referred as shown in FIG. 7, and are not described herein. The barycentric coordinates of the group sets 1011~1019 are then outputted as the coordinates of the contact areas and the result of the touch operation.

It should be noted that, the touch-point coordinate detecting method of the present invention is not limited for detecting many touch points of the exemplary embodiment, and also can be used for detecting a signal touch point. In addition, one skilled in the art also can appropriately alter the touch-point coordinate detecting method of the exemplary embodiment of the present invention. For example, the method for judging the adjacent point data may be altered. Referring to FIG. 2 again, the point data A~D and F~I may be judged as the adjacent point data of the point data E. Alternatively, the coding rules of the identification codes may be altered, or the amount of the point data of the original data may be altered, etc.

In summary, the exemplary embodiment of the present invention mainly employs the group sets to endue the received original touch point data with the identification codes for identifying the group sets and calculating the barycentric coordinates of the group sets to generate the corresponding coordinates of the many touch points. Thus the present invention can output the real coordinates of the many touch points and can be configured for detecting the many touch points. Furthermore, the touch-point coordinate detecting method of the exemplary embodiment of the present invention also can be used for detecting a single touch point.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method for detecting touch-point coordinates, comprising:
    (a) scanning a plurality of signal points in sequence to generate a plurality of original data including a plurality of original touch point data, wherein each of the plurality of signal points corresponding to an original touch point datum is defined as a touch signal point;
    (b) enduing each of the touch signal points with an identification code and grouping the touch signal points into a plurality of group sets according to the identification codes; and
    (c) calculating a barycentric coordinate of each of the group sets and outputting the barycentric coordinate as a touch-point coordinate of each of the group sets;
    wherein step (b) comprises:
    judging whether a current touch signal point neighbors one or more previously scanned touch signal points;
    when the current touch signal point neighbors a single previously scanned touch signal point, enduing the current touch signal point with a same identification code as that of the previously scanned touch signal point; and
    when the current touch signal point does not neighbor any previously scanned touch signal point, enduing the current touch signal point with a new identification code;
    detecting an amount of the neighboring touch signal points of the current touch signal point;
    changing at least one of the identification codes of the neighboring touch signal points to make the identification codes of the neighboring touch signal points be identical when the amount of the neighboring touch signal points is more than one and the identification codes of the neighboring touch signal points are different; and
    grouping the touch signal points with the same identification code into a same group set.

2. The method as claimed in claim 1, wherein the step (b) further comprises:
    grouping the touch signal points with different identification codes into different group sets.

3. The method as claimed in claim 2, wherein the touch-point coordinate detecting method is adapted for a liquid crystal display with an in-cell touch panel.

4. The method as claimed in claim 3, wherein a sequence of enduing each of the touch signal points with the identification code is the same as a mode for the liquid crystal display scanning the signal points.

5. The method as claimed in claim 1, wherein step (c) comprises:
    performing weighted average operations for first-dimensional coordinates and second-dimensional coordinates of the touch signal points in each of the group sets to achieve the barycentric coordinate of each of the group sets.

6. The method as claimed in claim 1, wherein the step (b) further comprises:
    if the current touch signal point neighbors two or more previously scanned touch signal points, enduing the current touch signal point with a same identification code as that of a previously scanned touch signal point that was scanned first among all the previously scanned touch signal points neighboring the current touch signal point.

7. A method for detecting touch-point coordinates, comprises:
    (a) generating a plurality of original data which comprises a plurality of original touch point data, wherein each of the plurality of original touch point data corresponds to a touch signal point;
    (b) enduing each of the touch signal points with an identification code to identify a plurality of contact areas where the touch signal points are located according to the identification codes;
    (c) calculating a barycentric coordinate of the touch signal points in each of the contact areas; and
    (d) outputting the barycentric coordinate as coordinate of one touch area;
    wherein step (b) comprises:
    judging whether a current touch signal point neighbors one or more touch signal points previously endued with identification codes;
    when the current touch signal point neighbors a single touch signal point previously endued with an identification code, enduing the current touch signal point with a same identification code as that of the touch signal point previously endued with the identification code; and
    when the current touch signal point does not neighbor any touch signal point previously endued with an identification code, enduing the current touch signal point with a new identification code;
    detecting an amount of the neighboring touch signal points of the current touch signal point; and
    changing at least one of the identification codes of the neighboring touch signal points to make the identification codes of the neighboring touch signal points be identical when the amount of the neighboring touch signal points is more than one and the identification codes of the neighboring touch signal points are different.

8. The method as claimed in claim 7, wherein the step (b) further comprises:
    identifying the touch signal points with a same identification code in a same contact area; and identifying the touch signal points with different identification codes in different contact areas.

9. The method as claimed in claim 7, wherein step (c) comprises:
performing weighted average operations for first-dimensional coordinates and second-dimensional coordinates of the touch signal points in each of the contact areas to achieve the barycentric coordinate of each of the contact areas.

10. The method as claimed in claim 7, wherein the touch-point coordinate detecting method is adapted for a liquid crystal display with an in-cell touch panel.

11. The method as claimed in claim 10, wherein a sequence of enduing each of the touch signal points with the identification code is the same as a scanning mode of the liquid crystal display.

12. The method as claimed in claim 7, wherein the step (b) further comprises:
if the current touch signal point neighbors two or more touch signal points previously endued with identification codes, enduing the current touch signal point with a same identification code as that of a neighboring touch signal point that was previously endued with an identification code first among all the neighboring touch signal points previously endued with identification codes.

13. A method for detecting touch-point coordinates, comprising:
(a) scanning a plurality of signal points generated in a single touch operation, in sequence to generate a plurality of original touch point data, wherein each of the plurality of signal points corresponding to an original touch point datum is defined as a touch signal point;
(b) enduing each of the touch signal points with an identification code and grouping the touch signal points into a plurality of group set according to the identification codes;
(c) calculating a barycentric coordinate of the touch signal points with the same identification code to achieve at least one barycentric coordinate corresponding to the touch signal points; and
(d) outputting the at least one barycentric coordinate as a result of the single touch operation;

wherein step (b) comprises:
judging whether a current touch signal point neighbors one or more previously scanned touch signal points;
when the current touch signal point neighbors a single previously scanned touch signal point, enduing the current touch signal point with a same identification code as that of the previously scanned touch signal point; and
when the current touch signal point does not neighbor any previously scanned touch signal point, enduing the current touch signal point with a new identification code;
detecting an amount of the neighboring touch signal points of the current touch signal point;
changing at least one of the identification codes of the neighboring touch signal points to make the identification codes of the neighboring touch signal points be identical when the amount of the neighboring touch signal points is more than one and the identification codes of the neighboring touch signal points are different; and
grouping the touch signal points with the same identification code into a same group set.

14. The method as claimed in claim 13, wherein step (c) comprises:
performing weighted average operations for first-dimensional coordinates and second-dimensional coordinates of the touch signal points respectively to achieve the barycentric coordinate.

15. The method as claimed in claim 14, wherein the touch-point coordinate detecting method is adapted for a liquid crystal display with an in-cell touch panel.

16. The method as claimed in claim 15, wherein a sequence of enduing each of the touch signal points is the same as a scanning mode of the liquid crystal display.

17. The method as claimed in claim 13, wherein the step (b) further comprises:
if the current touch signal point neighbors two or more previously scanned touch signal points, enduing the current touch signal point with a same identification code as that of a previously scanned touch signal point that was scanned first among all the previously scanned touch signal points neighboring the current touch signal point.

* * * * *